Aug. 2, 1960

J. ROEDER, JR 2,947,150

REFRIGERATING APPARATUS HAVING IMPROVED HEAT TRANSFERRING MEANS

Filed Feb. 21, 1958

3 Sheets-Sheet 1

Inventor
John Roeder Jr.
By Schroeder, Hofgren, Brady & Wegner
Attorneys

Fig. 4.
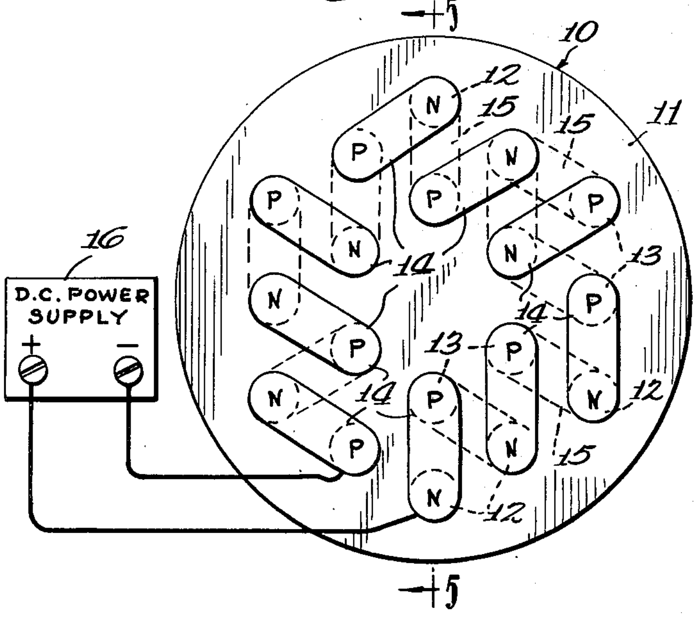
Fig. 5.
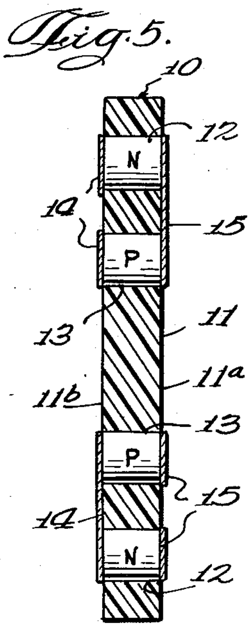
Fig. 6. Fig. 7.
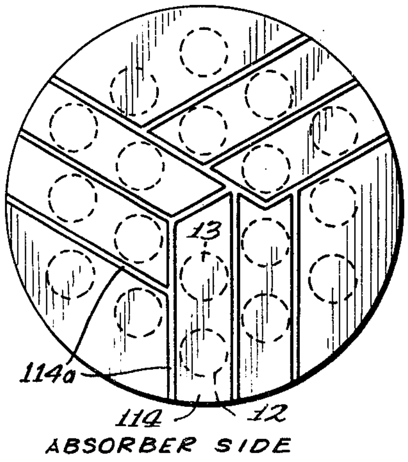
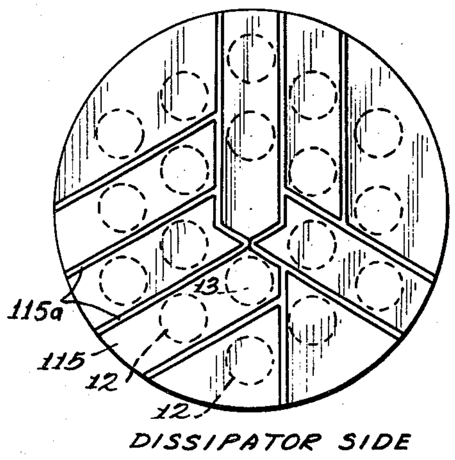
Inventor
John Roeder Jr
By Schroeder, Hofgren, Brady & Wagner
Attorneys Aug. 2, 1960 J. ROEDER, JR 2,947,150

REFRIGERATING APPARATUS HAVING IMPROVED HEAT TRANSFERRING MEANS

Filed Feb. 21, 1958 3 Sheets-Sheet 3

Inventor
John Roeder Jr.
By Schroeder, Hofgren, Brady & Wagner
Attorneys

United States Patent Office 2,947,150
Patented Aug. 2, 1960

2,947,150

REFRIGERATING APPARATUS HAVING IMPROVED HEAT TRANSFERRING MEANS

John Roeder, Jr., Benton Harbor, Mich., assignor to Whirlpool Corporation, a corporation of Delaware Filed Feb. 21, 1958, Ser. No. 716,795
12 Claims. (Cl. 62—3)

This invention relates to a thermoelectric refrigerating apparatus and to a thermocouple panel for use therein.

In the refrigerating apparatus of this invention either one or a plurality of thermocouple panels are employed. In one embodiment the cold junctions and the hot junctions of the thermocouple or thermocouples are adapted to make direct contact with the refrigerant. In that case, of course, the refrigerant is one that is not an electrical conductor. The Freons are refrigerants of this type.

In this invention the cold junctions of the thermocouple bank or banks may be used to cool a remote space or area by using the refrigerant as a heat transfer medium. The hot junctions have their heat transferred to the exterior of the unit also by means of a refrigerant. In each instance the refrigerant is contained in an elongated conduit which extends from the thermocouples to transfer heat to or from a remote area.

In order to further increase the efficiency of such a system, the thermocouple panel of this invention provides at least one pair of dissimilar thermoelectric elements having hot and cold junctions with these junctions comprising metal members preferably exposed for direct contact with the two refrigerant systems.

A feature of this invention is to provide an improved refrigerating apparatus comprising a thermocouple including at least one pair of dissimilar thermoelectric elements and electrical conducting metal members connecting said elements in electrical series to provide a cold junction and a hot junction on opposite sides of said thermocouple when said series is subjected to a thermoelectric current, a first closed fluid conduit including an elongated tube adapted to contain a volatile refrigerant, a first portion of said first conduit being spaced from said cold junction and adapted to contain liquid refrigerant to operate as a heat absorber and a second portion of the first conduit being in thermal contact with said cold junction and adapted to contain gaseous refrigerant to operate as a heat dissipator, and a second closed fluid conduit including an elongated tube adapted to contain a volatile refrigerant, a first portion of said second conduit being spaced from said hot junction and adapted to contain gaseous refrigerant to operate as a heat dissipator and a second portion of the second conduit being in thermal contact with said hot junction and adapted to contain liquid refrigerant to operate as a heat absorber and cool said hot junction.

Another feature of the invention is to provide an improved thermocouple panel comprising a substantially fluid impervious block of thermal and electrical insulating material having a pair of opposite side surfaces, at least one pair of dissimilar thermoelectric elements in said block having their opposite ends oriented toward said side surfaces, and electrical conducting metal members at said opposite side surfaces connecting said elements in electrical series to provide a cold junction at one of said side surfaces and a hot junction at the other when said series is subjected to a thermoelectric current, said metal members being exposed for direct contact with a refrigerant for efficient heat transfer to and from said junctions.

Other features and advantages of the invention will be apparent from the following description of certain embodiments thereof taken in conjunction with the accompanying drawings. Of the drawings:

Figure 4 is a side elevational view of a thermoelectric couple panel embodying the invention.

Figure 5 is a sectional elevational view taken substantially along line 5—5 of Figure 4.

Figure 6 is an elevational view of one side of a thermocouple panel embodying the invention.

Figure 7 is a view similar to Figure 6 but showing the other side.

Figure 1:
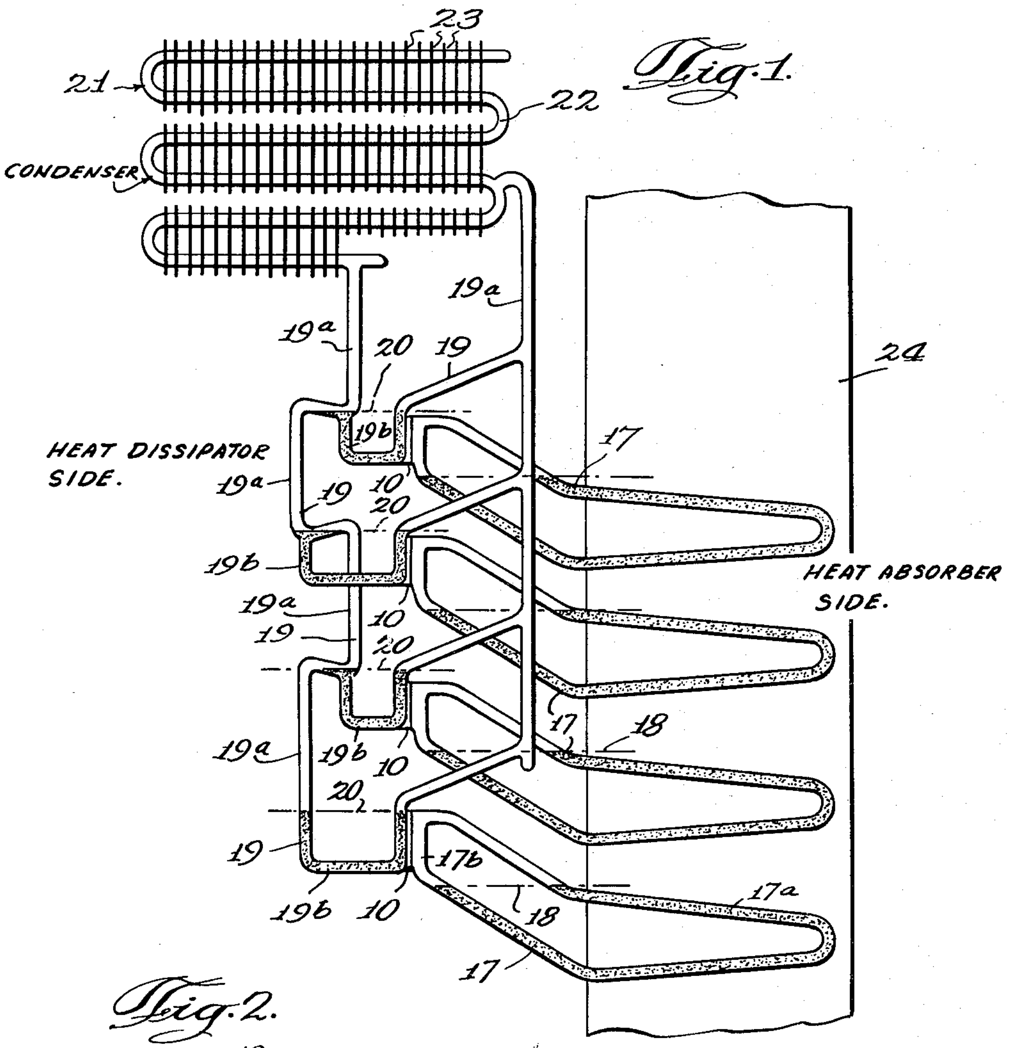
Figure 1 is a semi-diagrammatic elevational view of a refrigerating system embodying the invention.

In the embodiment of the refrigerating apparatus and thermocouple bank shown in Figures 1 to 5 inclusive, there is provided a series of thermocouple panels 10. Each panel, as is shown most clearly in Figures 4 and 5, includes a substantially fluid impervious and relatively thin block 11 of thermal and electrical insulating material. Each block as shown is substantially circular and has opposed parallel side surfaces **11*a* and 11*b*. Held within the block 11 and extending from the surface 11*a* to the surface 11*b* are a series of dissimilar thermoelectric elements 12 and 13. The elements 12 are marked "N" and the elements 13** are marked "P." These markings indicate their thermoelectric characteristics. Thus the elements "N" are of a material having an abundance of electrons and bismuth is a good example of this type of material. The elements marked "P" are of a material having an abundance of electron vacancies. Antimony is a good example of this type of material.

The elements 12 and 13 are connected in electrical series by means of metal strips 14 and 15 on opposite sides of the block 11. When a thermoelectric current such as the D.C. power supply 16 is connected to this series in the manner shown in Figure 4, the strips 14 act as cold junctions while the strips 15 operate as hot junctions. The hot and cold junctions are of a high heat and electrical conducting metal that is preferably either copper or aluminum. Of these copper is preferred. The block 11 may be any of the well known insulating materials that are also impervious to the fluid refrigerant. Epoxy resin is one that may be used and polyurethane is another example of such a material.

The ends of the elements 12 and 13 are attached to the strips 14 and 15 as by soldering. A preferred method of making such a thermoelectric panel is to first attach the ends of a plurality of dissimilar thermoelectric elements such as the elements 12 and 13 to parallel plates of copper or the like, having substantially the same diameter as the completed panel, as shown in Figure 4. The space between the parallel plates is then filled with the insulating material 11 in fluid form. The material is then hardened in the well known manner between the plates and around the elements 12 and 13. The major portions of the plates are then removed as by grinding, milling, etching or the like to leave the metal strips 14 and 15.

A second example of thermocouple panels is illustrated in Figures 6 and 7. Here the elements 12 and 13 are connected in series by means of metal strips 114 and 115. In this embodiment adjacent strips are separated by narrower spaces 114*a* and 115*a* respectively and the pairs of elements are closer together so that a more compact panel is achieved. In both embodiments the same number of pairs of elements are used to provide the same number of hot and cold junctions and the same cooling capacity. Of course, in each embodiment, the number of pairs of elements shown is only exemplary as any desired number of pairs may be used.

Figure 2:
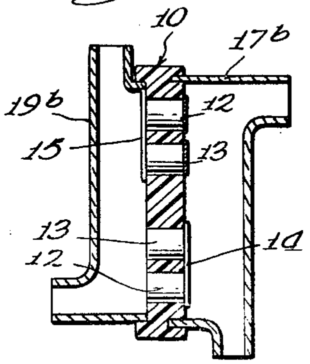
Figure 2 is a sectional elevational view taken substantially along line 2—2 of Figure 3.
Figure 3:
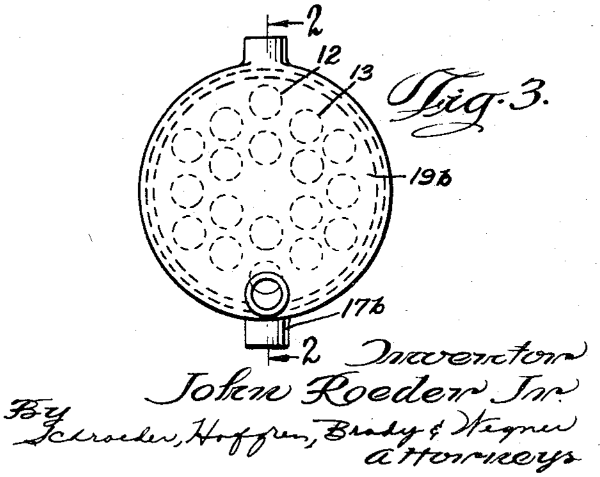
Figure 3 is a side elevational view of a thermoelectric couple panel of the invention and associated structure.

The refrigerating apparatus shown in Figures 1 to 3 comprises a plurality of first fluid conduits each including an elongated closed circuit tube 17. Each tube 17 includes a first portion 17*a* spaced from the cold junction of the corresponding panel 10 and a second portion 17*b* adjacent to this cold junction. The portions 17*a* and 17*b* are part of an endless tube and the portion 17*a* is at a lower level than the portion 17*b*.

Each of the first conduits 17 contains a refrigerant such as Freon 11 and when the apparatus is in operation, the normal fluid level is substantially as indicated at 18. Thus the first portion 17*a* is adapted normally to contain liquid refrigerant while the portion 17*b* which is above the liquid is adapted to contain refrigerant vapor.

In order to insure good thermal contact of the refrigerant vapor with the cold junctions 14 of the panel 10 the portion 17*b* of the conduit 17 is open as indicated in Figures 2 and 3 and is attached to the panel 10 to enclose the cold junctions 14. Thus, the cold junctions are exposed for direct contact with the refrigerant vapor.

A series of interconnected second conduits 19 are also provided. These second conduits are also in the form of elongated tubes and each includes a first portion 19*a* based from the panel 10 and a second portion 19*b* adjacent to this panel. The first portion 19*a* is at a higher elevation than the portion 19*b* and the interconnected second conduits 19 are each adapted to contain a refrigerant with the liquid level in normal operation as indicated at 20. Each second portion 19*b* in the vicinity of its panel 10 is likewise open as is portion 17*b* of each first conduit and is attached to the opposite side of panel 10 to surround and enclose the hot junctions 15. This results in the liquid refrigerant in the portions 19*b* making direct contact with the junctions 15.

As is shown in Figure 1, the plurality of second conduits 19 are interconnected with the topmost portion 19*a* being connected to a condenser 21. This condenser is in the form of the usual serpentine tube 22, having attached thereto heat conducting fins 23. One of the portions 19*a* is connected to the bottom of this condenser while another portion 19*a* is connected to the condenser at an intermediate point between the top and the bottom.

With the arrangement of the second conduits 19 and the condenser 21 as described, refrigerant vapor rises in the portions 19*a* of the conduit to the condenser 21 where the vapor is condensed to a liquid. The liquid then flows back down the tubes under the influence of gravity and gathers in the second tube portions 19*b* which act as liquid traps.

In operation, the liquid refrigerant in the first portions 17*a* of the first conduits 17 may be incorporated with and attached to a metal panel indicated at 24 at the food compartment of a refrigerator. Other means of heat transfer may, of course, be used if desired, such as the provision of fins for contact with the air within the refrigerator. Likewise the condenser 21 may be in the form of tubes fastened to the inside of the refrigerator outer metal shell.

In the operation of the refrigerating apparatus of the embodiment of Figures 1 to 3, the liquid refrigerant in each first portion 17*a* evaporates to cool these portions and the surrounding environment. The refrigerant vapor flows upwardly into the elevated second portions 17*b* where it contacts the cold junctions 14. These cold junctions condense the refrigerant vapor to the liquid and the liquid flows by gravity to the lower first portions 17*a* so that the refrigerating action is continuous.

Similarly the liquid refrigerant in the lower portions 19*b* of the series of second conduits 19 evaporates to cool the hot junctions 15. The refrigerant vapor rises in the first portions 19*a* to the condenser 21 where the vapors are condensed back to the liquid. The liquid then flows countercurrently back down the first portions 19*a* of the second conduit into the second portions 19*b* which operate as fluid traps. Thus here also the operation is continuous.

Figure 11:
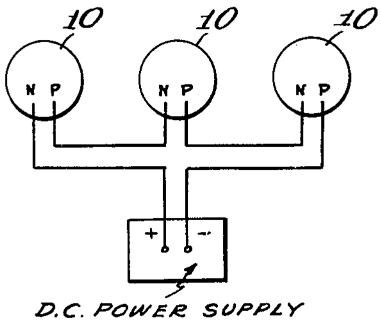
Figure 11 is a wiring diagram showing one method of connecting a series of thermocouple panels to a source of thermoelectric current.

The manner in which a series of thermocouple panels may be connected to a single power supply is shown diagrammatically in Figure 11. Here, for purposes of illustration, only three panels 10 are shown. For simplicity of illustration, only one "N" element and one "P" element is indicated in each panel. It is to be understood, of course, that this is only for illustration and that actually a plurality of similar electric elements are customarily used each with its hot and cold junctions as illustrated in Figures 4 to 7.

Figures 8, 9:
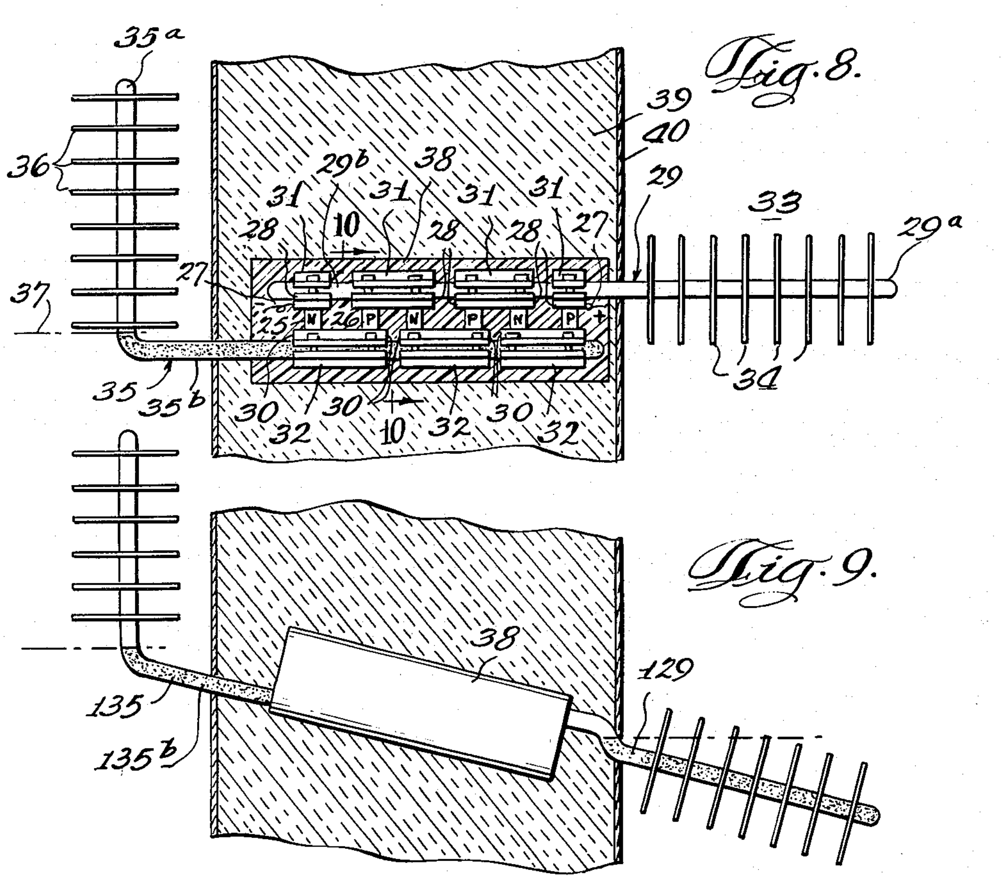
Figure 8 is a sectional elevational view illustrating a second embodiment of the refrigerating apparatus of this invention.
Figure 9 is a sectional elevational view showing a third embodiment of the refrigerating apparatus of this invention.
Figure 10:
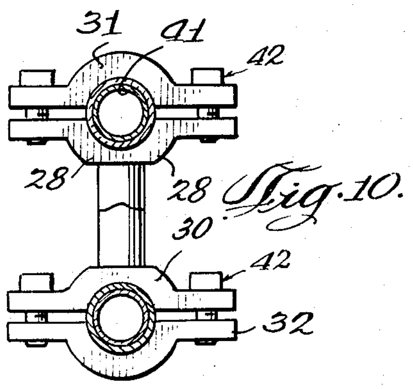
Figure 10 is a sectional view taken substantially along line 10—10 of Figure 8.

In the embodiments shown in Figures 8 and 10, the plurality of dissimilar thermoelectric elements 25 and 26 are aligned laterally. An electrical connection as indicated at 27 is attached to a metal member 28 which partially surrounds the bottom of a first fluid conduit 29 in the form of an elongated tube. This metal member 28 is connected to the end "N" element 25 and the other side of this element is connected to a second metal member 30. This member 30 is also connected to the adjacent "P" element 26. The other elements 25 and 26 are similarly connected in electrical series by the members 28 and 30 with the sources of power being indicated by the numerals 27. In this arrangement the elements 30 operate as hot junctions and the elements 28 operate as cold junctions.

The elements 28 are held in close contact with the fluid conduit tube 29 by means of clamp members 31. Similar clamp members 32 hold the hot junctions 30 against the second conduit 35 also in the form of an elongated tube. The junctions and their associated clamp members are held together by any means desired such as the bolts 42 as illustrated.

A first portion 29*a* of the first conduit 29 extends into a refrigerated space 33 and is provided with metal fins 34. The second portion 29*b* of this conduit is in contact with the cold junctions 28. The second conduit 35 includes a first portion 35*a* located in a heat dissipating space and is also provided with fins 36. A second portion 35*b* of the conduit 35 extends in contact with the hot junctions 30.

Each of the conduits 29 and 35 is partially filled with a liquid refrigerant. In normal operation, the lower portion of each conduit contains the liquid refrigerant and the upper portion contains refrigerant vapor. In the second conduit 35 the normal liquid level is indicated by the numeral 37. In the first conduit 29, the refrigerant is condensed to the liquid form in the portion 29*b* that is in contact with the cold junctions 28. Thus the refrigerant gives up its heat to these cold junctions. In the first portion 29*a* of the conduit which is in the refrigerated space 33, the liquid refrigerant evaporates and extracts heat from the space 33 by means of the fins 34.

Similarly the hot junctions 30 give up their heat to the liquid refrigerant in the portion 35*b* of the second conduit 35 and converts the liquid refrigerant to a vapor. This vapor rises in the remote portion 35*a* of conduit 35 and gives up its heat to the surrounding atmosphere primarily by way of the fins 36. In giving up this heat, the refrigerant vapor is converted back to the liquid and flows into the lower portion 35*b* for contact again with the hot junctions 30. Thus the structure here also operates as a heat pump.

The conduit portions 29b and 35b in the vicinity of the elements 25 and 26, the elements themselves, the hot junctions 28, the cold junctions 30 and the clamp members 31 and 32 are preferably encased in a block 38 of thermal and electrical insulating material which is preferably adherent to these members. This block holds the entire assembly together as a unit. In the embodiment shown the block and the associated structure is located in the insulation 39 of a refrigerator wall 40.

The thermal and electrical insulating material may be any of the well known plastics, preferably a foamed plastic that is substantially rigid and that preferably is foamed in place. Among the foamed plastics that may be used are foamed polystyrene, foamed polyurethane and the like. Because of its excellent physical properties and because it may be foamed in place to adhere firmly to the surfaces which it contacts to produce a rigid block, a foamed, rigid polyurethane is preferred. These are well known and widely used materials and are easily produced. In general the foamed, rigid polyurethanes are produced by reacting an organic diisocyanate such as toluene 2.4-diisocyanate with a polyester of a dibasic acid and a trihydric alcohol in which the ester contains free hydroxy and carboxylic groups with the reaction taking place in the presence of water. Methods of producing such rigid polyurethane foams are disclosed, for example, in U.S. Patent 2,577,281 with Example 17 showing an excellent method of preparing such a rigid foam.

In a method disclosed in the above patent an alkyd resin is first produced as by reacting 4 mols of glycerol and 2.5 mols of adipic acid in the presence of 0.5 mols of phthalic anhydride. This resin is the polyester. This resin is then reacted with the diisocyanate and preferably water as the foaming agent, also preferably in the presence of a non-ionic wetting agent to promote more uniform cell formation. A catalyst such as benzoyl peroxide is also preferably included and if desired a flame retarding agent such as is disclosed in the patent.

In the embodiment shown in Figure 9 all elements are the same as shown in Figure 8 except here the first conduit 129 has its liquid refrigerant end inclined downwardly while the second conduit 135 has the second portion 135b thereof inclined upwardly. These inclinations serve to aid the flow of liquid refrigerant and to speed up this flow.

The tubes 29, 35, 129 and 135 are made of metal, preferably copper. Similarly the hot and cold junctions and the clamps are also made of metal. In order to electrically isolate these metal parts, a thin tube of electrical insulation material 41 such as Mylar is provided surrounding each tube in the area of the hot and cold junctions and clamps.

In the embodiment of the invention shown in Figures 1 to 7 inclusive, the hot and cold junctions are in direct contact with the refrigerant and are isolated from the air in order to prevent excessive corrosion. In addition, the small panels are easy to install in production and are easy to replace as a unit if such becomes necessary. In addition the panels are quite inexpensive but are strong and sturdy, when compared to structures in the prior art.

The embodiments of Figures 8 to 10 have the advantage of being small, compact and self-contained. Furthermore, they may be easily installed where needed and in the numbers required and operate efficiently with minimum attention. Heat transfer to and from the unit is efficient. The use of refrigerant as the heat transfer medium adds to this efficiency.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. A refrigerating apparatus, comprising: a thermocouple including at least one pair of dissimilar thermoelectric elements and electrical conducting metal members connecting said elements in electrical series to provide a cold junction and a hot junction on opposite sides of said thermocouple when said series is subjected to a direct current; a first closed fluid conduit including an elongated tube adapted to contain a volatile refrigerant, a first portion of said first conduit being spaced from said cold junction and adapted to contain liquid refrigerant to operate as a heat absorber and a second portion of the first conduit being in thermal contact with said cold junction and adapted to contain gaseous refrigerant to operate as a heat dissipator; and a second closed fluid conduit including an elongated tube adapted to contain a volatile refrigerant, a first portion of said second conduit being spaced from said hot junction and adapted to contain gaseous refrigerant to operate as a heat dissipator and a second portion of the second conduit being in thermal contact with said hot junction and adapted to contain liquid refrigerant to operate as a heat absorber and cool said hot junction.

2. The apparatus of claim 1 wherein each of said conduits is endless and describes a closed figure, the second portion of said first conduit being at a higher elevation than the first portion thereof and the first portion of said second conduit being at a higher level than the second portion thereof.

3. The apparatus of claim 1 wherein the second portion of said first conduit encloses said cold junction and the second portion of the second conduit encloses the hot junction for direct contact of the refrigerant in the conduits with the respective junctions.

4. A refrigerating apparatus, comprising: a plurality of thermocouple panels each including a plurality of pairs of dissimilar thermoelectric elements and electrical conducting metal members connecting said elements in electrical series to provide a cold junction and a hot junction on opposite sides of said thermocouple when said series is subjected to a direct current; a plurality of heat transfer devices each including a first closed fluid conduit including an elongated tube adapted to contain a volatile refrigerant, a first portion of the first conduit being spaced from a cold junction and adapted to contain liquid refrigerant to operate as a heat absorber and a second portion of the first conduit being in thermal contact with a cold junction and adapted to contain gaseous refrigerant to operate as a heat dissipator; a plurality of heat transfer devices including a second closed fluid conduit including an elongated tube adapted to contain a volatile refrigerant, a first portion of the second conduit being spaced from a hot junction and adapted to contain gaseous refrigerant to operate as a heat dissipator and a second portion of the second conduit being in thermal contact with a hot junction and adapted to contain liquid refrigerant to operate as a heat absorber and cool said hot junction; and a sheet of metal in heat transfer relationship to a refrigerated space, said first fluid conduit being in thermal contact with said metal sheet for cooling the same and thus said space.

5. The apparatus of claim 4 wherein each of said conduits is endless and describes a closed figure, the second portion of said first conduit being at a higher elevation than the first portion thereof and the first portion of said second conduit being at a higher level than the second portion thereof.

6. The apparatus of claim 5 wherein the second portion of said first conduit encloses said cold junction and the second portion of the second conduit encloses the hot junction for direct contact of the refrigerant in the conduits with the respective junctions.

7. A refrigerating apparatus, comprising: a thermocouple including at least one pair of dissimilar thermoelectric elements; a first closed fluid conduit including an elongated tube adapted to contain a volatile refrigerant; a second closed fluid conduit including an elongated tube adapted to contain a volatile refrigerant; electrical conducting metal members connecting said elements in electrical series to provide a cold junction and a hot junction on opposite sides of said thermocouple when said series is subjected to a direct current, a first portion of said first conduit being spaced from said cold junction and adapted to contain liquid refrigerant to operate as a heat absorber and a second portion of the first conduit being in thermal contact with said cold junction and adapted to contain gaseous refrigerant to operate as a heat dissipator; means clamping said second portion of the first conduit to the cold junction; a second closed fluid conduit including an elongated tube adapted to contain a volatile refrigerant, a first portion of said second conduit being spaced from said hot junction and adapted to contain gaseous refrigerant to operate as a heat dissipator and a second portion of the second conduit being in thermal contact with said hot junction and adapted to contain liquid refrigerant to operate as a heat absorber and cool said hot junction; and means clamping said second portion of the second conduit to the hot junction.

8. A refrigerating apparatus, comprising: a thermocouple panel including a plurality of pairs of dissimilar thermoelectric elements and electrical conducting metal members connecting said elements in electrical series to provide cold junctions and hot junctions on opposite sides of said thermocouple when said series is subjected to a direct current; a first closed fluid conduit including an elongated tube adapted to contain a volatile refrigerant, a first portion of said first conduit being spaced from said cold junctions and adapted to contain liquid refrigerant to operate as a heat absorber and a second portion of the first conduit being in thermal contact with said cold junctions and adapted to contain gaseous refrigerant to operate as a heat dissipator, said metal members of the cold junctions partially surrounding said second portion of the first conduit; clamp members engaging the metal members of the cold junctions to clamp said second portion of the first conduit therebetween; a second closed fluid conduit including an elongated tube adapted to contain a volatile refrigerant, a first portion of said second conduit being spaced from said hot junctions and adapted to contain gaseous refrigerant to operate as a heat dissipator and a second portion of the second conduit being in thermal contact with said hot junctions and adatped to contain liquid refrigerant to operate as a heat absorber and cool said hot junctions, said metal members of the hot junctions patrially surrounding said second portion of the second conduit; and clamp members engaging the metal members of the hot junctions to clamp said second portion of the second conduit therebetween.

9. A refrigerating apparatus, comprising: a thermocouple panel including a plurality of pairs of dissimilar thermoelectric elements and electrical conducting metal members connecting said elements in electrical series to provide cold junctions and hot junctions on opposite sides of said thermocouple when said series is subjected to a direct current; a first closed fluid conduit including an elongated tube adapted to contain a volatile refrigerant, a first portion of said first conduit being spaced from said cold junctions and adapted to contain liquid refrigerant to operate as a heat absorber and a second portion of the first conduit being in thermal contact with said cold junctions and adapted to contain gaseous refrigerant to operate as a heat dissipator, said metal members of the cold junctions partially surrounding said second portion of the first conduit; clamp members engaging the metal members of the cold junctions to clamp said second portion of the first conduit therebetween; a second closed fluid conduit including an elongated tube adapted to contain a volatile refrigerant, a first portion of said second conduit being spaced from said hot junctions and adapted to contain gaseous refrigerant to operate as a heat dissipator and a second portion of the second conduit being in thermal contact with said hot junctions and adapted to contain liquid refrigerant to operate as a heat absorber and cool said hot junctions, said metal members of the hot junctions partially surrounding said second portion of the second conduit; clamp members engaging the metal members of the hot junctions to clamp said second portion of the second conduit therebetween; and a block of substantially rigid thermal and electrical insulating material surrounding said thermoelectric elements, metal members of the hot and cold junctions, the clamp members and the corresponding parts of the first and second conduits.

10. A thermocouple device, comprising: a substantially fluid impervious block of thermal and electrical insulating material having a pair of opposite side surfaces; at least one pair of dissimilar thermo electric elments in said block having their opposite ends oriented toward said side surfaces; electrical conducting metal members at said opposite side surfaces connecting said elements in electrical series to provide a cold junction at one of said side surfaces and a hot junction at the other when said series is subjected to a direct current; and enclosure means defining chambers confronting each of said opposite side surfaces in electrically insulated association with the metal members for exposing the metal members at each of said opposite side surfaces to have direct contact with a refrigerant for efficient heat transfer to and from said junctions.

11. A thermocouple device, comprising: a substantially fluid impervious block of thermal and electrical insulating material having a pair of opposite side surfaces; a plurality of pairs of dissimilar thermoelectric elements in said block having their opposite ends oriented toward said side surfaces; electrical conducting metal members at said opposite side surfaces connecting said elements in electrical series to provide cold junctions at one of said side surfaces and hot junctions at the other when said series is subjected to a direct current; a refrigerant conduit attached to said block in fluid tight relationship therewith enclosing a space confronting said metal members on one side of the block and in electrically insulated association with said metal members; and a second refrigerant conduit attached to said block in fluid tight relationship therewith enclosing a space confronting said metal members on the other side of said block and in electrically insulated association with said metal members.

12. The method of making a thermocouple device, comprising: attaching the ends of a plurality of dissimilar thermoelectric elements to a pair of spaced electrical conducting plates with the elements therebetween; substantially filling the space between said plates and around said elements with a rigid thermal and electrical insulating material; removing portions of said metal plates to leave electrical conducting metal members interconnecting said elements in electrical series to produce cold junctions on one of said side surfaces and hot junctions on the other when the series is subjected to a direct current; and securing enclosure means to said insulating material to define spaces confronting the hot and cold junctions respectively.

References Cited in the file of this patent

UNITED STATES PATENTS

| | | |
|---|---|---|
| 1,120,781 | Altenkirch et al. | Dec. 15, 1914 |
| 2,729,949 | Lindenblad | Jan. 10, 1956 |
| 2,807,657 | Jenkins | Sept. 24, 1957 |
| 2,843,647 | Anderson | July 15, 1958 |
| 2,870,610 | Lindenblad | Jan. 27, 1959 |
| 2,886,618 | Goldsmid | May 12, 1959 |